United States Patent [19]
Mitsuhashi et al.

[11] Patent Number: 5,385,203
[45] Date of Patent: Jan. 31, 1995

[54] PLATE FIN HEAT EXCHANGER BUILT-IN TYPE MULTI-STAGE THERMOSIPHON

[75] Inventors: Ken-ichiro Mitsuhashi; Koichi Ueno, both of Takasago; Shin-ichiro Kashihara, Kobe, all of Japan

[73] Assignee: Kabushiki Kaisha Kobe Seiko Sho, Kobe, Japan

[21] Appl. No.: 179,690

[22] Filed: Jan. 11, 1994

[30] Foreign Application Priority Data

Jan. 11, 1993 [JP] Japan .................................. 5-002672

[51] Int. Cl.$^6$ ............................................. F25J 5/00
[52] U.S. Cl. ..................................... 165/110; 165/143; 165/145; 62/36
[58] Field of Search ................. 165/143, 145, 110; 62/36

[56] References Cited

U.S. PATENT DOCUMENTS

| | | | |
|---|---|---|---|
| 2,026,233 | 12/1935 | Kirgan | 165/143 |
| 3,590,909 | 7/1971 | Butt | 62/36 |
| 5,222,549 | 6/1993 | Ishii et al. | 165/110 |
| 5,303,769 | 4/1994 | Hoegberg | 165/110 |

FOREIGN PATENT DOCUMENTS

| | | |
|---|---|---|
| 420442 | 5/1954 | Belgium . |
| 2431103 | 2/1980 | France . |

Primary Examiner—Albert W. Davis, Jr.
Attorney, Agent, or Firm—Oblon, Spivak, McClelland, Maier, & Neustadt

[57] ABSTRACT

According to the present invention there is provided a small-sized thermosiphon free from deterioration in its cooling efficiency caused by pressure loss of a refrigerant and in which a two-phase flow of a fluid to be cooled is sure to be distributed uniformly. The thermosiphon includes a cooling cylinder 1 having a plurality of independent refrigerant tanks 2 formed by partition walls 1c which are disposed between fluid inlet port 1a and outlet port 1b inside the cylinder, and a plate fin type heat exchanger 50 extending inside the cylinder through the partition walls 1c hermetically sealably. Under this construction, it is not necessary to use pipes for the circulation of refrigerant C between the refrigerant tanks 2 and refrigerant circulation paths 54 in the heat exchanger 50, thus preventing the deterioration of the cooling efficiency caused by pressure loss of the refrigerant. Besides, it also becomes unnecessary to use a to-be-cooled fluid pipe for the connection between plural refrigerant tanks, whereby a two-phase flow of the fluid to be cooled is sure to be distributed uniformly and the deterioration of the cooling efficiency is prevented, thus permitting reduction in the size of the thermosiphon.

3 Claims, 7 Drawing Sheets

PLATE FIN HEAT EXCHANGER BUILT-IN TYPE MULTI-STAGE THERMOSIPHON

BACKGROUND OF THE INVENTION

1. Field of the Invention

The present invention relates to an improvement of a thermosiphon for use in a liquefying plant wherein a fluid to be cooled is subjected to precooling for liquefaction, and more particularly to a space-saving type and plate fin heat exchanger built-in type multi-stage thermosiphon which permits reduction in the number of pipes for a fluid to be cooled and for a refrigerant and thereby permits reduction in size of the apparatus.

2. Description of the Related Art

In a natural gas liquefying plant for liquefying a fluid to be cooled, e.g. natural gas, there is disposed a multi-stage thermosiphon for precooling the natural gas to effect liquefaction. As such multi-stage thermosiphons there are known one using a plate fin type heat exchanger 50 which will be described later and one using a shell and tube type heat exchanger in which a plurality of heat exchanging tubes are disposed in parallel.

Figure 5:
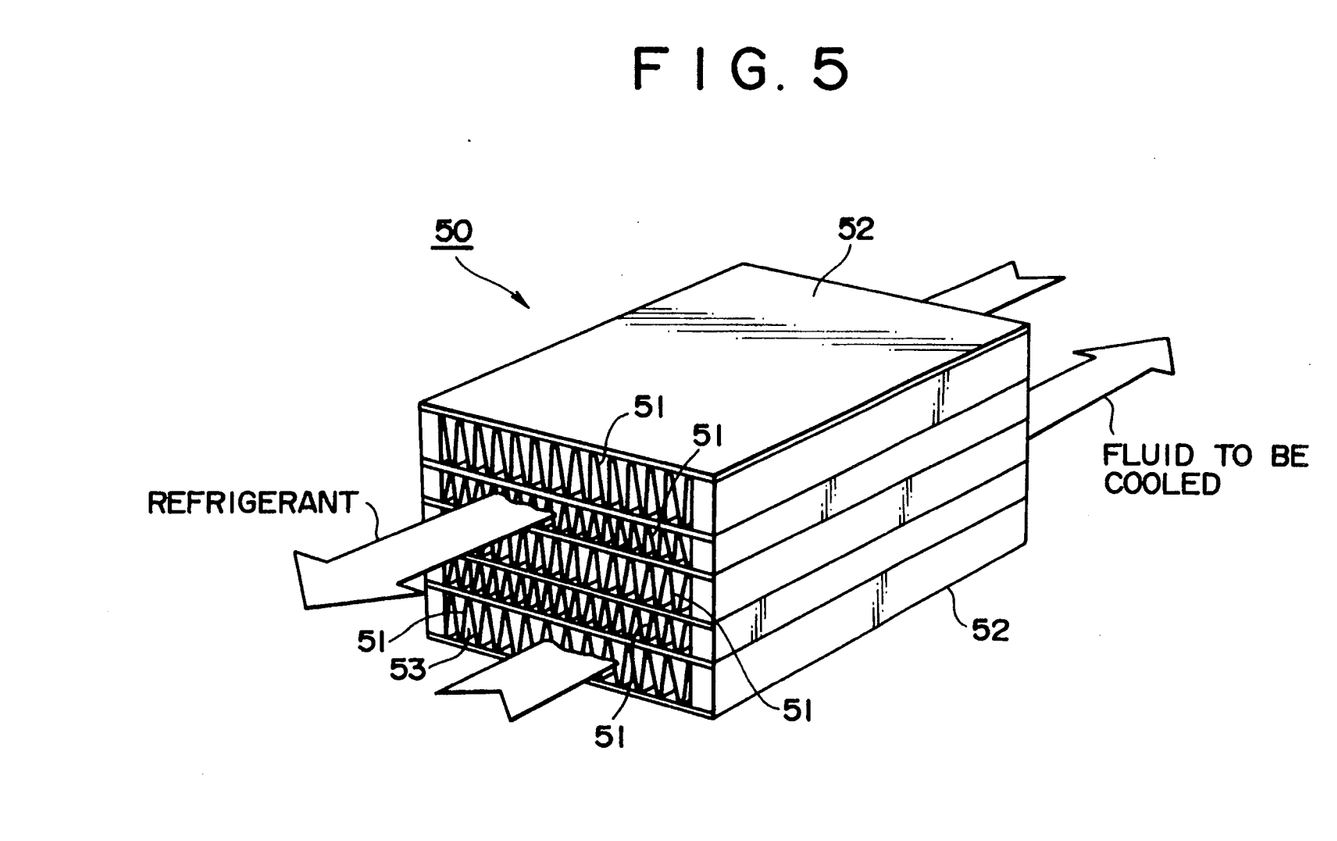
FIG. 5 is a perspective view of a principal portion of a plate fin type heat exchanger.
Figure 6:
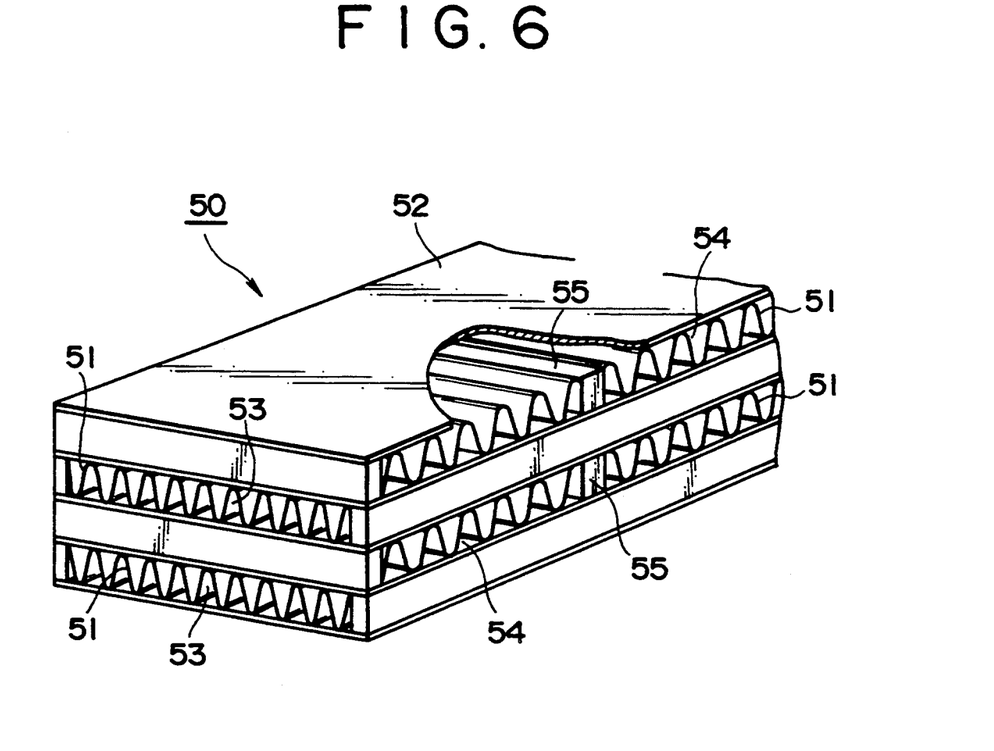
FIG. 6 is a partially cut-away perspective view thereof.

Description is now directed to the construction of the typical plate fin type heat exchanger 50, which is illustrated as a perspective view of its principal portion in FIG. 5. As shown in the same figure, plural plate fins 51 formed in a corrugated shape and flat plates 52 are laminated in an alternate manner, and between the flat plates 52 there are formed to-be-cooled fluid flow paths 53 and refrigerant circulation paths 54 in an alternately manner. A fluid to be cooled is allowed to flow in a direction same as or opposite to a circulating direction of a refrigerant. In the plate fin type heat exchanger 50, as shown in FIG. 6 which is a partially cut-away perspective view of the heat exchanger, a plurality of corrugated plate fins 51 are disposed between the to-be-cooled fluid flow paths 53 in a direction orthogonal to the flow paths. Further, partition plates 55 are disposed at predetermined intervals to define a plurality of independent groups of refrigerant circulation paths 54, and the refrigerant is allowed to circulate in a direction orthogonal to the flowing direction of the fluid to be cooled.

Figure 7:
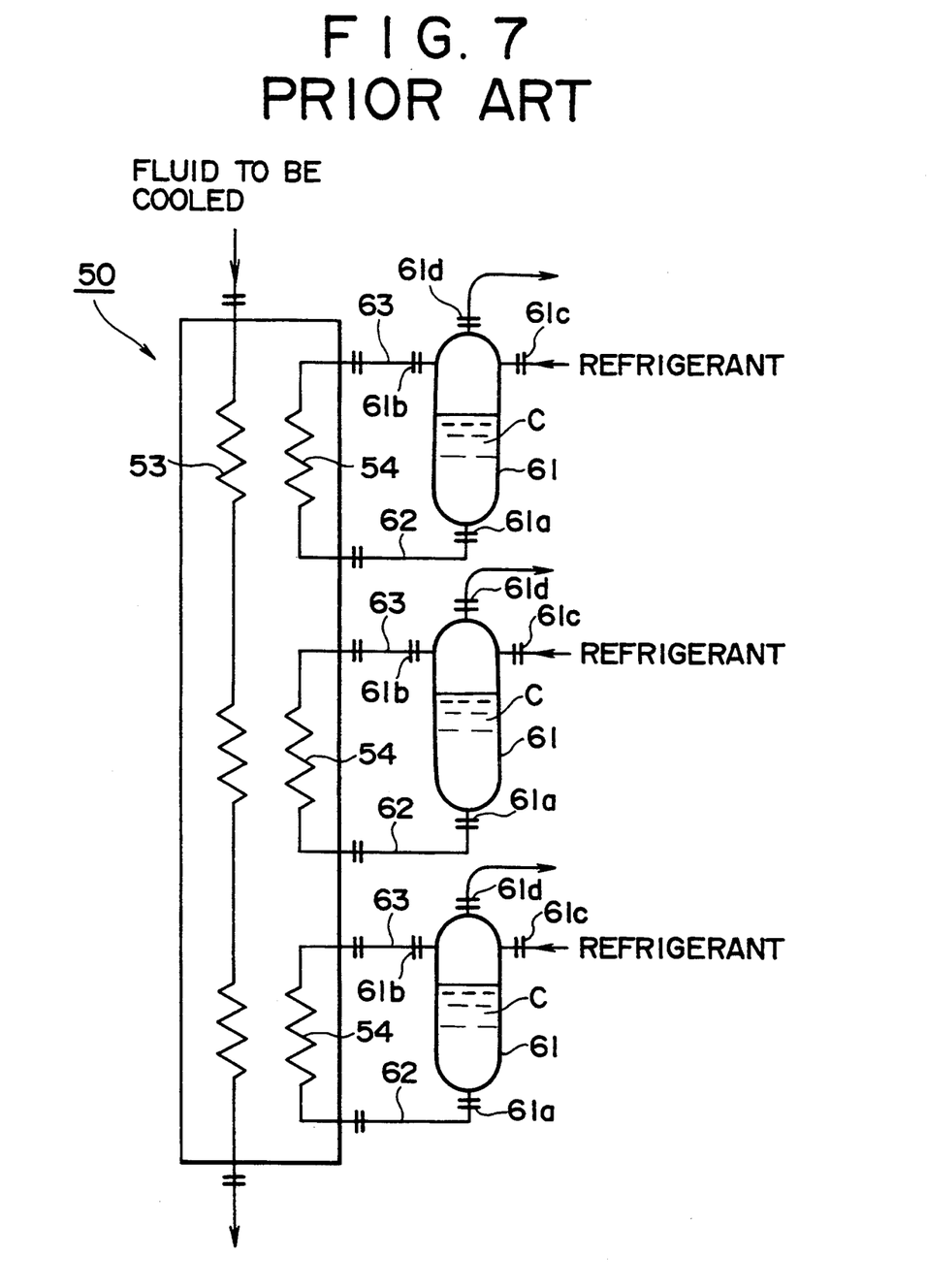
FIG. 7 is a schematic diagram of a plate fin heat exchanger built-in type multi-stage thermosiphon according to a first prior art example.

Examples of multi-stage thermosiphons will now be described with reference to FIGS. 7 and 8, in which the same reference numerals as above are used with respect to the construction of a plate fin type heat exchanger used therein. FIG. 7 is a schematic diagram of a plate fin heat exchanger built-in type multi-stage thermosiphon according to a first prior art example, in which refrigerant tanks are externally provided. More specifically, the reference numeral 50 in the same figure denotes a plate fin type heat exchanger. In the heat exchanger 50, a plurality of independent refrigerant circulation paths 54 formed between to-be-cooled fluid paths 53 are partitioned by partition plates disposed in a direction orthogonal to the fluid paths 53, though not shown. Refrigerant supply pipes 62 and refrigerant return pipes 63 are in communication with the refrigerant circulation paths 54 from three refrigerant tanks 61 each provided with a refrigerant supply port 61a for the supply of, for example, liquid propane gas (hereinafter referred to as the "refrigerant") and also provided with a refrigerant return port 61b for return of the refrigerant which is in a gaseous or gas-liquid state. Under this construction, while natural gas (hereinafter referred to as the "fluid to be cooled" or "to-be-cooled fluid") flows through the to-be-cooled fluid flow paths 53 in the plate fin type heat exchanger 50, it is precooled by the refrigerant which is circulated in the refrigerant circulation paths from the refrigerant tanks 61 through the refrigerant supply pipes 62, then flows out and is fed to the next cooling process (not shown). The refrigerant in each refrigerant tank 61 absorbs heat from the to-be-cooled fluid, vaporizes partially, and the vaporized refrigerant is sucked from a refrigerant suction port 61d, while the remaining refrigerant again stays as liquid within the refrigerant tank 61. As to replenishment of the refrigerant into the tank 61, it is performed through a refrigerant replenishing port 61c.

Figure 8:
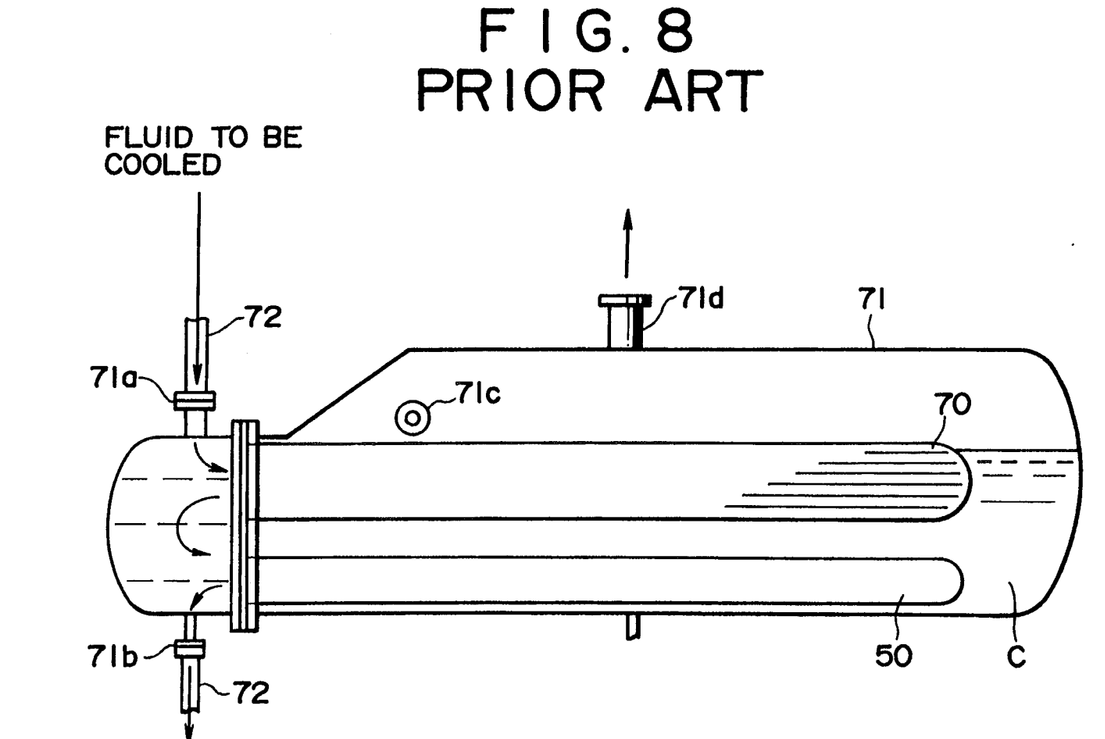
FIG. 8 is an explanatory construction diagram of a shell and tube heat exchanger built-in type multi-stage thermosiphon according to a second prior art example.

FIG. 8 shows the construction of a shell and tube heat exchanger type thermosiphon according to a second example of the prior art, in which a refrigerant tank 71 is disposed horizontally. Though not shown, a plurality of refrigerant tanks 71 are connected in series through a to-be-cooled fluid pipe 72 to constitute a multi-stage thermosiphon. Within each refrigerant tank 71 is disposed a tube bundle 70 having a to-be-cooled fluid flow path comprising a plurality of bent tubes which are in communication with both an inlet port 71a formed on one end side for the admission of natural gas as the fluid to be cooled and an outlet port 71b formed on an opposite end side for the discharge of the natural gas after precooling. The tube bundle 70 is immersed in a refrigerant which has been introduced from a refrigerant supply port 70c. Therefore, the fluid to be cooled flowing into the tank through the inlet port 71a is cooled while passing through the to-be-cooled fluid flow path, then passes through the fluid pipe 72 connected to the outlet port 71b and flows into the thermosiphon located on the downstream side, in which the fluid is again precooled. The thus-precooled fluid which has flowed out from the outlet port 71b of the thermosiphon located as the last-stage siphon on the downstream side is fed to the next cooling process.

In the plate fin heat exchanger type multi-phase thermosiphon according to the first prior art example described above, the refrigerant tanks and the plate fin type heat exchanger are arranged separately. Consequently, it is necessary to provide refrigerant supply pipes and return pipes for the circulation of the refrigerant between the refrigerant tanks and the heat exchanger, thus inevitably resulting in increase in the size of such a multi-stage thermosiphon. Further, the pressure of the refrigerant becomes low due to pressure loss in such pipes, so that the boiling point of the refrigerant rises and the cooling performance of the multi-stage thermosiphon is deteriorated. For ensuring a predetermined cooling performance, therefore, it is required to increase the size of the multi-stage thermosiphon. This problem remains to be solved.

In the shell and tube heat exchanger type thermosiphon according to the second example of the prior art described above, since the flow path of the fluid to be cooled is formed within each refrigerant tank, it is not necessary to use such refrigerant supply pipes and return pipes as in the first prior art example. However, the shell and tube type heat exchanger is inferior in the heat exchange performance to the plate fin type heat exchanger. In addition, it is necessary to use a pipe for the flow of fluid to be cooled from an upstream-side refrigerant tank to a downstream-side tank. Thus, like the first conventional example, an increase in the size of the multi-stage thermosiphon is unavoidable. Further, since the fluid to be cooled undergoes a phase change, that is, it is condensed into a two-phase flow, it is necessary that the two-phase flow of the fluid flowing from an upstream-side refrigerant tank to a downstream-side tank through the to-be-cooled fluid pipe be flowed in a uniformly distributed state through the downstream-side thermosiphon. However, such uniform distribution of the two-phase flow is extremely difficult and so there is a fear of deterioration in the cooling performance of the multi-stage thermosiphon. This problem also remains to be solved.

SUMMARY OF THE INVENTION

Accordingly, it is the object of the present invention to provide a plate fin heat exchanger built-in type multi-stage thermosiphon which does not require refrigerant supply pipes, refrigerant return pipes and fluid pipes for stage-to-stage connection, nor does it require uniform distribution of a two-phase flow, and which therefore permits reduction in size of the thermosiphon.

The present invention is based on the idea that if such a long plate fin type heat exchanger as in the first prior art example described above is disposed within a cooling cylinder having a plurality of refrigerant tanks, not only it becomes unnecessary to provide refrigerant supply and return pipes or fluid pipes for stage-to-stage connection, but also becomes no longer necessary to perform uniform distribution of a two-phase flow, thus making it possible to reduce the size of the multi-stage thermosiphon.

Therefore, in a first aspect of the present invention there is provided a plate fin heat exchanger built-in type multi-stage thermosiphon mainly characterized by including a cooling cylinder and a plate fin type heat exchanger, the cooling cylinder having on one end side thereof an inlet port for the admission of a fluid to be cooled and on an opposite end side thereof an outlet port for the discharge of the fluid, the interior of the cooling cylinder being partitioned by partition walls disposed between the inlet port and the outlet port to form a plurality of independent refrigerant tanks each having a refrigerant supply port and a refrigerant suction port, and the plate fin type heat exchanger extending hermetically sealably through the partition walls and having a to-be-cooled fluid flow path for allowing the fluid to be cooled to flow from the inlet port to the outlet port and also having refrigerant circulation paths for circulating a refrigerant inside the refrigerant tanks.

In a second aspect of the present invention there is provided a plate fin heat exchanger built-in type multi-stage thermosiphon mainly characterized by combination with the multi-stage thermosiphon in the first aspect of the invention wherein the plural refrigerant tanks are arranged vertically.

In a third aspect of the present invention there is provided a plate fin heat exchanger built-in type multi-stage thermosiphon mainly characterized by combination with the multi-stage thermosiphon in the first aspect of the invention wherein the plural refrigerant tanks are arranged horizontally.

According to the plate fin heat exchanger built-in type multi-stage thermosiphons in the first to third aspects of the present invention, a plate fin type heat exchanger extends within the cooling cylinder hermetically sealably through partition walls which partition the interior of the cylinder into plural refrigerant tanks. Therefore, like the first conventional example, it is not necessary to provide a pipe for the flow of fluid to be cooled from an upstream-side refrigerant tank to a downstream-side tank, nor is it necessary to provide refrigerant supply pipes and return pipes for communication between the refrigerant tanks and the refrigerant circulation path in the heat exchanger. Further, since the to-be-cooled fluid flow path in the heat exchanger is in communication with both the inlet and outlet ports for the fluid to be cooled of the cooling cylinder, a two-phase flow of the fluid to be cooled is sure to be distributed uniformly.

DETAILED DESCRIPTION OF THE PREFERRED EMBODIMENTS

Plate fin heat exchanger built-in type multi-stage thermosiphons embodying the present invention will be described hereinunder with reference to FIGS. 1 to 4 attached hereto. Since the constructions of the plate fin type heat exchangers used in the following embodiments are similar to that of the plate fin type heat exchanger described above in the prior art examples, the components common to both will be indicated and outlined using the same reference numerals as in the prior art examples.

Figure 1:
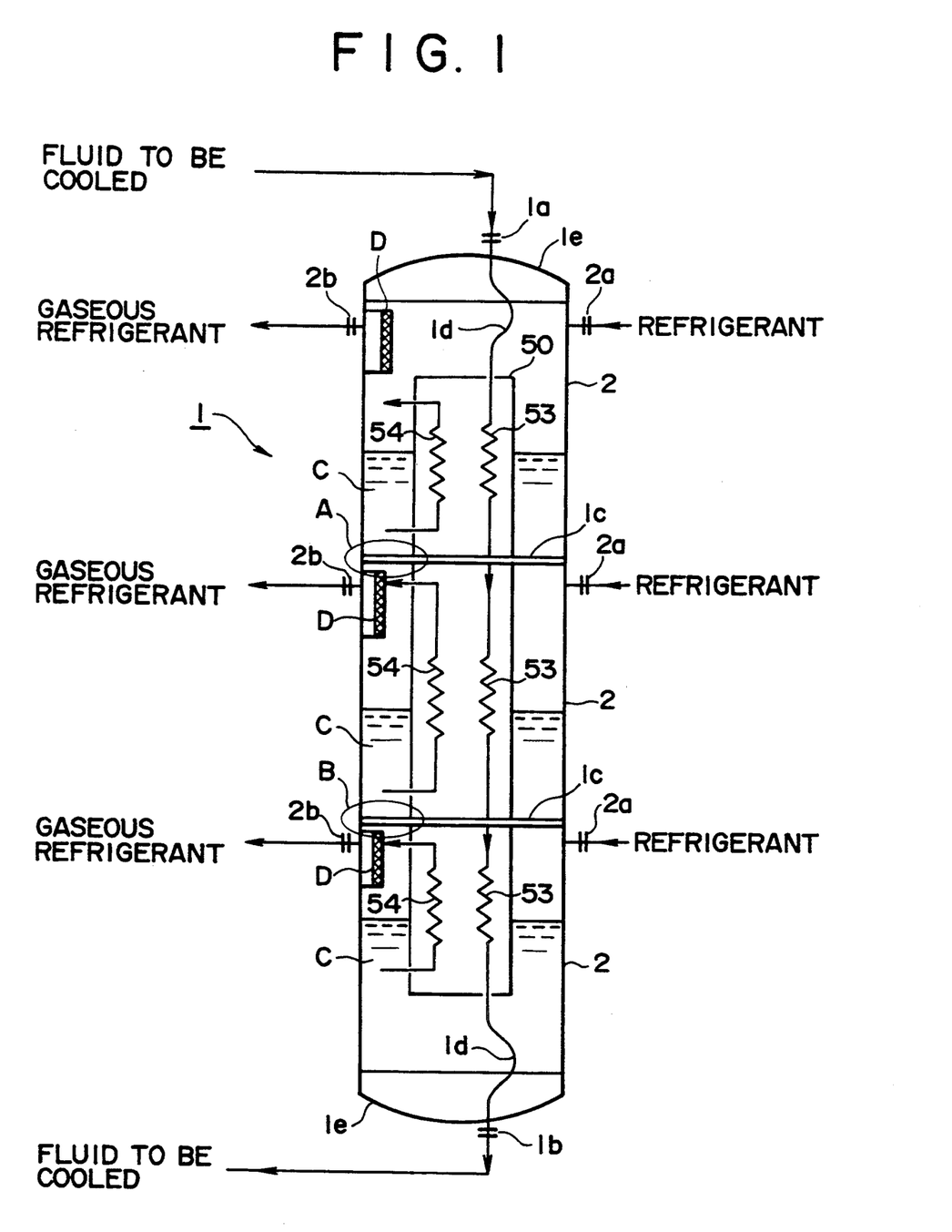
FIG. 1 is a schematic sectional view of a plate fin heat exchanger built-in type multi-stage thermosiphon according to an embodiment of the present invention.
Figure 2A:
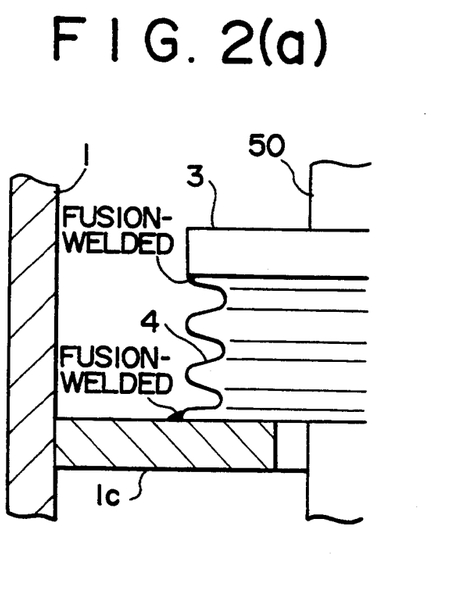
FIGS. 2(a) and 2(b) are enlarged detail views of a portion indicated at A in FIG. 1.
Figure 2B:
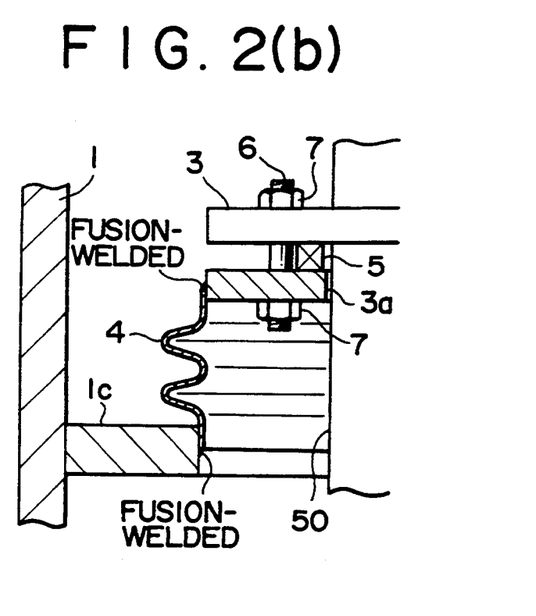
Figure 3:
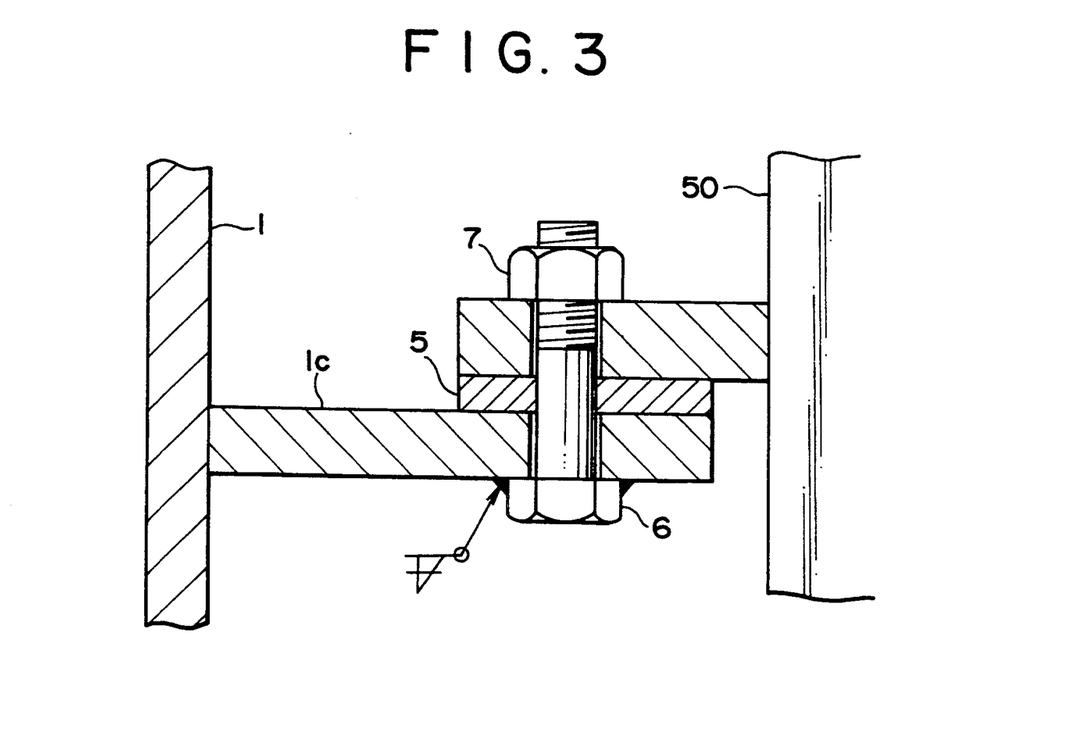
FIG. 3 is an enlarged detail view of a portion indicated at B in FIG. 1.

FIG. 1 is a schematic sectional view of a plate fin heat exchanger built-in type thermosiphon according to an embodiment of the present invention, FIGS. 2(a) and 2(b) are enlarged detail views of a portion A in FIG. 1, and FIG. 3 is an enlarged detail view of a portion B in FIG. 1. In FIG. 1, the reference numeral 1 denotes a cooling cylinder which is long vertically. The cooling cylinder 1 is provided at the upper end thereof with an inlet port 1a for the admission of a fluid to be cooled and at the lower end thereof with an outlet port 1b for discharge of the fluid. Between the inlet port 1a and the outlet port 1b are disposed two partition walls 1c, 1c to define three refrigerant tanks 2, 2, 2. These tanks are each provided with a refrigerant supply port 2a and a refrigerant suction port 2b.

Within the cooling cylinder 1 is disposed a plate fin type heat exchanger 50 having the same construction as that referred to above in connection with the prior art. In the heat exchanger 50, which extends through the partition walls 1c, 1c hermetically sealably in such a state as will be described later, flow paths 53 of a fluid to be cooled are in communication with the inlet port 1a and outlet port 1b through bent pipes 1d. These bent pipes each have a bent portion in which the pipe is deformed. More specifically, the cooling cylinder 1 and the partition walls 1c are made of carbon steel, while the plate fin type heat exchanger 50 is formed of an aluminum alloy, and thus there is a great difference in thermal expansion between the two. For this reason, the multi-stage thermosiphon must have a construction which permits absorption of such difference in thermal expansion. To this end, the bent pipes 1d are used. Refrigerant circulation paths 54 in the plate fin type heat exchanger 50 are partitioned in three with partition plates (not shown) disposed in corresponding positions through the partition plates 1c, 1c. Therefore, the refrigerant, indicated at C, which has been supplied from the refrigerant supply ports 2a and is staying in the refrigerant tanks 2, absorbs heat from the fluid to be cooled in the refrigerant circulation paths 54, thereby vaporizes partially, and the vaporized refrigerant is sucked from the refrigerant suction ports 2b, while the remaining refrigerant stays again as liquid within the tanks 2. The fluid to be cooled which has entered from the inlet port 1a and is flowing toward the outlet port 1b is cooled while flowing through the flow paths 53 by the refrigerant thus circulating through the refrigerant circulation paths.

On the other hand, also between the plate fin type heat exchanger 50 and the partition walls 1c it is required to absorb the difference in thermal expansion. Means for absorbing such thermal expansion difference will be understood well by reference to FIGS. 2(a), 2(b) and 3. More specifically, as shown in FIG. 2(a), a through hole of a large diameter is formed in one partition wall 1c, while a through hole of a small diameter is formed in the other partition wall 1c, then collar-like flanges 3, 3 of large and small diameters, respectively, are provided on the outer periphery of the heat exchanger 50. A bellows ring 4 is interposed between one flange 3 and the associated partition wall 1c and the contact portion between the bellows ring 4 and the flange, as well as the contact portion between the bellows ring 4 and the partition wall 1c, are fusion-welded. Alternatively, as shown in FIG. 2(b), the lower portion of a bellows ring 4 is fusion-welded to the partition wall 1c, while the upper portion thereof is fusion-welded to the outer peripheral surface of a sub-flange 3a which is clamped to the flange 3 with bolt 6 and nut 7 through a packing 5, and the nut 7 and the sub-flange 3a are fusion-welded to each other in order to ensure hermetic seal. As to the other flange 3, it is clamped to the partition wall 1c with bolt 6 and nut 7 through a sheet packing 5 put on the flange surface, and the head portion of the bolt 6 and the partition wall 1c are fusion-welded together for ensuring hermetic seal.

Such clamping work for the flange 3 and the partition wall 1c is performed by inserting a clamping tool such as a spanner or the like into the cooling cylinder 1 through a manhole (not shown) formed in the cooling cylinder, or by a worker who has entered the cylinder 1. The reason why through holes of different inside diameters are formed in the partition walls 1c, 1c is because of consideration given to mounting of the plate fin heat exchanger 50 to the cooling cylinder 1. Further, in a certain particular length of the cooling cylinder 1 and in order to facilitate the assembling of the heat exchanger 50, etc., there may be adopted a construction wherein both end plates 1e are made detachable, while the cooling cylinder 1 is divided and then coupled using flanges.

Thus, the bellows ring 4 is used for absorbing the difference in thermal expansion between the cooling cylinder 1 and the plate fin type heat exchanger 50. However, without using such thermal expansion difference absorbing means, there may be adopted a construction wherein a seal ring is provided between the inner peripheral surface of the through hole formed in a partition wall 1c and the outer peripheral surface of the associated flange 3 to effect a hermetically sealable sliding contact, or a construction wherein the cooling cylinder 1 is divided at its longitudinal center and then coupled integrally through a bellows pipe of a large diameter, or a construction wherein the partition wall 1c is made as thin as possible so as to permit an elastic deformation of the partition wall itself. The difference in thermal expansion can be absorbed by any of these means.

The following description is now provided about the operation of the plate fin heat exchanger built-in type multi-stage thermosiphon constructed as above. The fluid to be cooled flows into the cooling cylinder 1 through the inlet port 1a formed at the upper end of the cylinder, then passes through the bent pipe 1d and flows into the to-be-cooled fluid flow path 53 in the plate fin type heat exchanger 50. On the other hand, the refrigerant C, which has been poured into each refrigerant tank 2, is circulating while partially vaporizing from below to above through the refrigerant circulation path 54. Consequently, the fluid which has entered the flow path 53 is cooled, passes through the bent pipe 1d and flows out from the outlet port 1b formed at the lower end of the cylinder.

According to the plate fin heat exchanger built-in type multi-stage thermosiphon of the above embodiment, as described above, the plate fin type heat exchanger 50 extends within the cooling cylinder 1 hermetically sealably through the partition walls 1c, 1c which partition the cooling cylinder into three refrigerant tanks 2. Therefore, unlike the foregoing first conventional example, it is not required to provide refrigerant supply and return pipes for the circulation of refrigerant between each refrigerant tank and the refrigerant circulation path 54 in the heat exchanger 50. Further, unlike the foregoing second conventional example, it is no longer necessary to provide a pipe for the flow of the fluid to be cooled from an upstream-side refrigerant tank to a downstream-side refrigerant tank. Thus, since various pipes can be omitted, the reduction in size of the multi-stage thermosiphon can be attained and it is possible to greatly reduce the mounting space for the thermosiphon. Moreover, unlike the second prior art example, it is not necessary to give consideration to uniform distribution of a two-phase flow and it is possible to prevent the rise in boiling point of the refrigerant which is caused by pressure loss, so there is no fear of deterioration in the cooling performance of the multi-stage thermosiphon. Additionally, as shown in FIG. 1, if a droplet removing function is imparted to each refrigerant tank 2 by providing a droplet removing device D at the gaseous refrigerant outlet portion of each refrigerant suction port 2b, it becomes unnecessary to use a gas-liquid separator which is for preventing the entry of droplets into a compressor, thus greatly contributing to the simplification of the liquefying plant.

The multi-stage thermosiphon described above is of an opposite flow type wherein the flowing direction of the fluid to be cooled and the circulating direction of the refrigerant are opposite to each other. The technical idea of the present invention is also applicable to a parallel flow type multi-stage thermosiphon wherein an inlet port 1a for the fluid to be cooled is provided at the lower end of the cooling cylinder 1, while an outlet port 1b for the fluid after cooling is provided at the upper end of the cylinder, and the flowing direction of the fluid to be cooled and the circulating direction of the refrigerant are parallel with each other.

Figure 4:
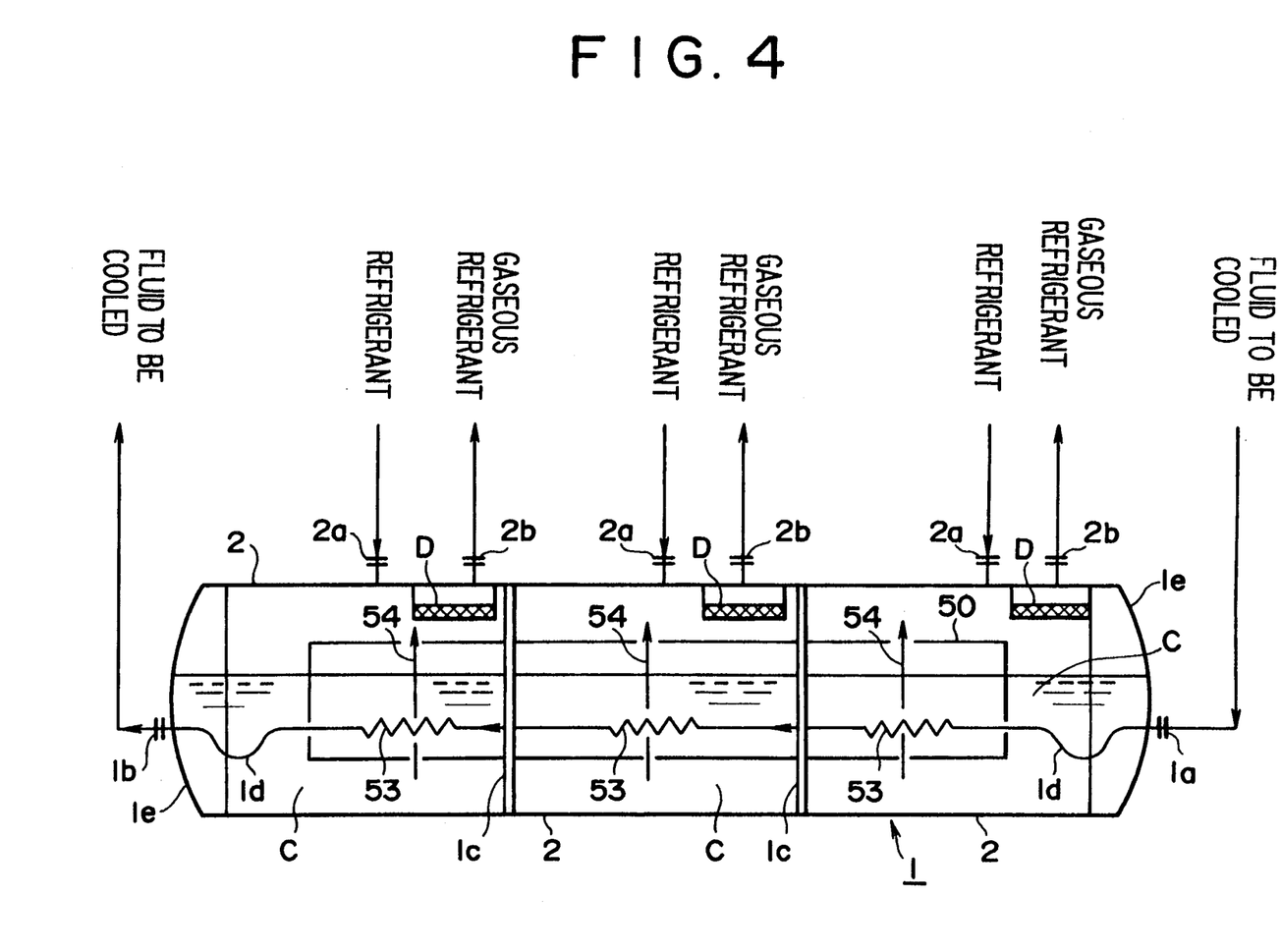
FIG. 4 is a schematic sectional view of a plate fin heat exchanger built-in type multi-stage thermosiphon according to another embodiment of the present invention.

A plate fin heat exchanger built-in type multi-stage thermosiphon according to another embodiment of the present invention will now be described with reference to FIG. 4. As will be seen well from the same figure, the construction of the multi-stage thermosiphon according to this embodiment is different from that of the previous embodiment in that the cooling cylinder 1 is disposed horizontally and that refrigerant circulation paths 54 in the plate fin type heat exchanger 50 are different as will be described below.

According to the construction of the refrigerant circulation paths 54 in this embodiment, as shown in the partially cut-away perspective view of FIG. 6 already referred to in connection with the prior art, a plurality of corrugated plate fins 51 are arranged between flow paths 53 of the fluid to be cooled so as to be orthogonal to these flow paths, whereby the refrigerant is circulated in a direction orthogonal to the flowing direction of the fluid to be cooled.

Of course, the difference in thermal expansion between the cooling cylinder 1 and the plate fin type heat exchanger 50 is absorbed by the same thermal expansion difference absorbing means as that used in the previous embodiment.

Therefore, the fluid to be cooled which enters the cooling cylinder 1 through the inlet port 1a of the cylinder is cooled while flowing through the to-be-cooled fluid flow path 53 in the plate fin type heat exchanger 50, then flows out from the outlet port 1b. That is, the fluid to be cooled is cooled by the circulation of the refrigerant which flows from below to above through the refrigerant circulation paths 54 orthogonal to the flow paths 53 and returns into the refrigerant tanks 2. Also in this embodiment there are attained the same effects as in the previous embodiment because it is not necessary to provide refrigerant supply and return pipes and pipes for the flow of the fluid from upstream- to downstream-side refrigerant tank.

Although multi-stage thermosiphons each having three refrigerant tanks have been described above, these are mere embodiments of the present invention and hence the scope of the technical idea of the invention is by no means limited thereby. Further, changes in design, etc. may be made within the scope not departing from the technical idea of the present invention.

According to the plate fin heat exchanger built-in type multi-stage thermosiphon in the first to third aspects of the present invention, as set forth hereinabove, there is used a cooling cylinder having a plurality of independent refrigerant tanks formed by partition walls disposed between inlet and outlet ports of fluid to be cooled within the cooling cylinder, and a plate fin type heat exchanger extends hermetically sealably through those partition walls. Consequently, it is no longer necessary to use refrigerant supply and return pipes and pipes for the fluid to be cooled which have been essential to the conventional multi-stage thermosiphons. As a result, the rise in boiling point of the refrigerant which is caused by pressure loss is prevented, there is no fear of non-uniform distribution of a two-phase flow, and it becomes possible to attain the reduction in size of the multi-stage thermosiphon, thus greatly contributing to the improvement in the cooling performance of the thermosiphon and to the reduction in the mounting space thereof.

What is claimed is:

1. A plate fin heat exchanger built-in type multi-stage thermosiphon including:

a cooling cylinder having on one end side thereof an inlet port for the admission of a fluid to be cooled and on an opposite end side thereof an outlet port for the discharge of the fluid, the interior of said cooling cylinder being partitioned by partition walls disposed between said inlet port and said outlet port to form a plurality of independent refrigerant tanks each having a refrigerant supply port and a refrigerant suction port; and a plate fin type heat exchanger extending hermetically sealably through said partition walls and having a to-be-cooled fluid flow path for allowing the fluid to be cooled to flow from said inlet port to said outlet port and also having refrigerant circulation paths for circulating a refrigerant inside said refrigerant tanks.

2. A plate fin heat exchanger built-in type multi-stage thermosiphon according to claim 1, wherein said plural refrigerant tanks are arranged vertically.

3. A plate fin heat exchanger built-in type multi-stage thermosiphon according to claim 1, wherein said plural refrigerant tanks are arranged horizontally.

* * * * *